US008622570B2

(12) United States Patent
Davis Hatfield et al.

(10) Patent No.: US 8,622,570 B2
(45) Date of Patent: Jan. 7, 2014

(54) ENHANCED STROLLER LIGHTING PROCESSES PRODUCTS THEREBY AND ACCOUTREMENTS

(76) Inventors: Rachelle Davis Hatfield, Costa Mesa, CA (US); Nicole Tena, Costa Mesa, CA (US)

(*) Notice: Subject to any disclaimer, the term of this patent is extended or adjusted under 35 U.S.C. 154(b) by 166 days.

(21) Appl. No.: 13/304,007

(22) Filed: Nov. 23, 2011

(65) Prior Publication Data

US 2012/0300439 A1 Nov. 29, 2012

Related U.S. Application Data

(60) Provisional application No. 61/480,985, filed on Apr. 29, 2011.

(51) Int. Cl.
*F21L 4/02* (2006.01)
*F21L 13/00* (2006.01)

(52) U.S. Cl.
USPC ........... 362/183; 362/191; 362/253; 362/545; 280/33.992

(58) Field of Classification Search
USPC ......... 362/183, 543, 544, 545, 191, 253, 396; 280/33.992
See application file for complete search history.

(56) References Cited

U.S. PATENT DOCUMENTS

| 5,938,216 | A | 8/1999 | Weng |
| 6,394,633 | B1 | 5/2002 | Perez |
| 6,558,018 | B1 | 5/2003 | Blum |
| 6,906,472 | B2 | 6/2005 | Wong |
| 7,131,756 | B2 * | 11/2006 | Leslie et al. ................. 362/488 |
| 7,651,242 | B1 * | 1/2010 | Guerrant ..................... 362/286 |
| 7,857,330 | B2 | 12/2010 | Chaudeurge |
| 7,997,775 | B2 * | 8/2011 | Hurwitz ....................... 362/474 |
| 8,025,433 | B2 | 9/2011 | Comrada |
| 8,356,824 | B1 * | 1/2013 | Manweiler et al. ...... 280/33.992 |
| 2003/0185018 | A1 | 10/2003 | Comrada |
| 2009/0244916 | A1 | 10/2009 | Conwell |

* cited by examiner

*Primary Examiner* — John A Ward
(74) *Attorney, Agent, or Firm* — Baker Hostetler, LLP

(57) ABSTRACT

Lighting systems for strollers enable users to integrate straight forward and modular lighting elements with eco-friendly practices to produce helpful and useful products whose functionality dictates safety levels consistent with statutory schemes for other wheeled vehicles, assuring visibility to both pedestrians and other street traffic.

5 Claims, 9 Drawing Sheets

ENHANCED STROLLER LIGHTING PROCESSES PRODUCTS THEREBY AND ACCOUTREMENTS

CROSS REFERENCES TO RELATED CASES

The instant application claims full Paris Convention Priority of, and expressly incorporates by reference U.S. Ser. No. 61/480,985 (Apr. 29, 2011) as if the same were expressly set forth herein. Said case was entitled STROLLER LIGHTING KIT and filed in the name of the present inventors, likewise all Paris Convention rights are expressly reserved.

BACKGROUND OF THE INVENTIONS

The present inventions relate to use of light emitting devices in conjunction with apparatus useful to transport children. In particular, the instant teachings combine lighting requirements derived from known statutory schemes with child stroller art to offer for consideration, it is respectfully proposed, progress in science and the useful arts, by setting forth subject matters constituting invention as defined to be United States Letters Patent eligible under law.

Diligent searching through numerous skilled professionals has only returned the following references, each of which is believed to be distinct from the teachings of the present invention, and herewith are disclosed solely to define the state of the art, as well as each being incorporated expressly by reference as if fully set forth herein:

US Patent Publications 2009/0244916; 2003/0185018 and U.S. Pat. Nos. 5,938,216; 6,558,018; 6,906,472; 6,394,633; 7,857,330; and 8,025,433. In sum, the present inventions address and overcome longstanding needs in the field of art to present enhanced and functionally effective lighting systems for strollers. It is respectfully submitted that, as discussed herein and claimed below, said teachings are new, novel and non-obvious to those having normal skill in the art.

The mere existence of various types of mechanically challenged stroller lighting devices makes it apparent that this field of art has strong needs to be addressed, however the paucity of commercial and practical solutions in the prior art (among other things) has motivated the present inventors to devote time and efforts to solving these issues. The present inventors have learned that what is needed is an infant stroller lighting system and approach which includes, for example, LED lighting units arrayed in more efficient and helpful ways. By way of example, the present inventors have yet to encounter such approaches including (but certainly not limited to) a front lighting unit attaching to the stroller front side and a side lighting unit attaching to each of the right and left sides of the stroller, much as contemplated by existing statutory schemes (for analogous vehicles, such as a bicycle), as detailed, in applicants' subject provisional, as further described below and claimed as proprietary by those claims which are set forth below, along with legally included permutations thereof.

OBJECTS AND SUMMARY OF THE INVENTIONS

Briefly stated, lighting systems for strollers enable users to integrate straight forward and modular lighting elements with eco-friendly practices to produce helpful and useful products whose functionality dictates safety levels consistent with statutory schemes for other wheeled vehicles, assuring visibility to both pedestrians and other street traffic for the subject inventions, to ensure added safety for children.

According to embodiments, there is provided a lighting system for strollers, comprising, in combination, at least a lighting unit disposed within a housing, attachment member affixed to the rear wall of the housing, and, a carrying enclosure for housing and transporting the at least a lighting unit, attachment member and related accoutrements, whereby the carrying enclosure is configured as a bag-like sac and readily attachable to any known stroller.

According to embodiments, there is provided a kit comprising, at least a lighting unit having a housing, a means for removably attaching the at least a lighting unit having a housing to any conventional stroller; and, bag-like retention means for holding and transporting contents of the kit along with instructions for use.

According to embodiments, there is provided a method of creating a lighted stroller, comprising, in combination, providing at least two lighting units, attaching the at least two lighting units to a stroller, and activating the at least two lighting units, whereby they emit and reflect light.

Likewise, and/or in conjunction with the instant teachings, the present stroller lighting system includes kits designed to attach to children's strollers and to illuminate the surroundings of the stroller during conditions of low lighting and nighttime. Artisans readily understand than an LED light with two bulbs may be perceived as visible from at least about 60 meters and has been advertised as having approximately 150 hours of life (450 uses at 20 minutes per use.

Further, according to embodiments, the instant stroller lighting systems and kits includes LED lighting units. As disclosed throughout and claimed below, each lighting unit includes a durable housing, a plurality of long-lasting LED lights disposed on the housing, and an attachment member attached to a rear wall of the housing. The LED lights were designed to comply with applicable local, State, and Federal bicycle-illumination laws, and children's safety laws, as feasible and cost-effective.

According to embodiments, LED front lighting units attach to a front side or front middle of the stroller and have white LED lights, resembling vehicle headlights, mindful that the number of stroller wheels is important. Likewise, those skilled in the art understand that such LEDs can utilize 2-4 AAA or 1-2 small disc batteries, virtually assuring long light life and low failure ratios for more than one light.

According to embodiments, the front lighting unit is also tiltable for increased visibility, meaning angled in greater than one ordinal plane, by design, and may have automatic timing means. For example, a 15-20 minute auto-shutoff.

According to embodiments, the front light unit may be removably attached to the front side of the stroller with a bracket mount, silicone light, or flush ziptie, or the like mechanical interface.

According to embodiments, LED side lighting units attach to each of the left and right sides of the stroller and have red reflector lights, and at least one of the left and right side lighting units may have a rear-facing white light for increased visibility (can't read your writing here).

The housing is provided in a wide range of varying sizes and in a wide range of colors and in a transparent form. Each lighting unit has at least one LED light thereon, although at least three LED lights are preferred. The attachment member is an elastic strap, and alternately a rare-earth magnet, a rubber/silicone strap, a clip, or a bracket with nuts and bolts provided for permanent attachment to the stroller.

In one embodiment, each lighting unit has a height of ¾ inch, a width of 1½ inches, and a depth of ¾ inch. In addition, the LED lights last up to approximately 100,000 hours and require little maintenance.

A storage bag, including in embodiments, a reusable bag with a zipper pocket for lights inside. Likewise, according to embodiments, a bag can also fold into a zippered pouch, and alternately, a console can be provided for storage of the lighting units. Each storage bag or console is provided with a carabineer for attachment to the stroller, according to embodiments.

Thus has been disclosed embodiments and features of the present stroller lighting kit so that the detailed description, thereof that follows may be better understood and in order that the present contribution to the art may be better appreciated by artisans, including the addition of later-developed technology.

Numerous objects, features and advantages of the present stroller lighting kit will be readily apparent to those of ordinary skill in the art upon reading the following detailed description of presently preferred, but nonetheless illustrative, examples of the present stroller lighting kit when taken in conjunction with the accompanying drawings. In this respect, before explaining the current examples of the present stroller lighting kit in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed, herein are for purposes of description and should not be regarded as limiting.

Those skilled in the art will appreciate that the conception upon which this disclosure is based may readily be utilized as a basis for the design of other structures, methods and systems for carrying out the several purposes of the stroller lighting kit. It is therefore important that the claims be regarded as including such equivalent constructions insofar as they do not depart from the spirit and scope of the present invention.

Objects of the present stroller lighting kit, along with various novel features that characterize the invention are particularly pointed out in the claims forming a part of this disclosure. For better understanding of the stroller lighting kit, its operating advantages and specific objects attained by its uses, refer to the accompanying drawings and description.

DETAILED DESCRIPTION OF THE INVENTIONS

Figure 1:
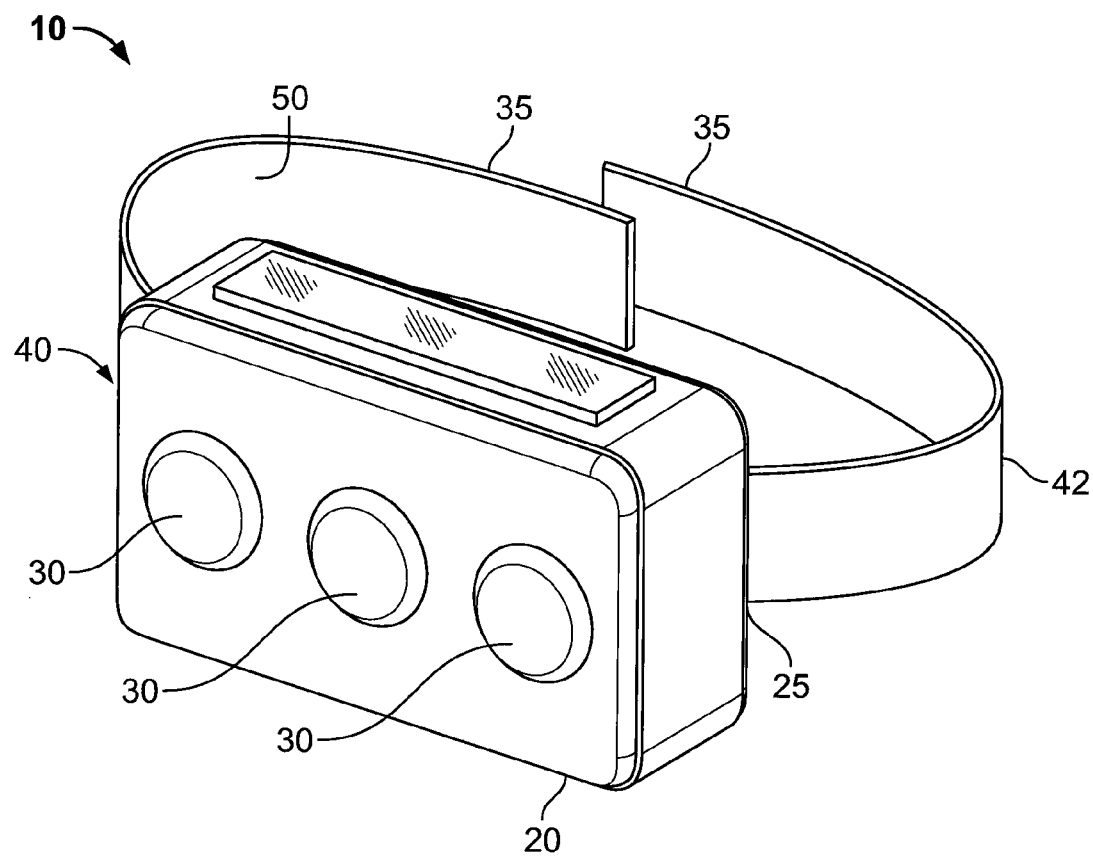
FIG. 1 is an isometric view of a side lighting unit, according to the present inventions.

The present inventors have developed the BUGGY LIGHTS™ brand of stroller lighting system to ensure added safety for stroller can be provided. Likewise, owing to existing legislation for wheeled vehicles, it is respectfully submitted that the instant system is readily adaptable to create standards for analogous legislation which is believed to be sorely needed for strollers.

With reference now to the drawings, and in particular FIGS. 1 through 9 thereof, examples of the instant stroller lighting kit employing the principles and concepts of the present invention and generally designated by the reference number 10 are described. Artisans are well aware that illustrative schematics are not offered for consideration to be limiting in any way, merely being offered for consideration to be demonstrative of operative feasibility.

Referring still to FIGS. 1 through 9 an exemplary embodiment of the present stroller lighting kit 10 is illustrated. The present stroller lighting kit 10 is designed to attach to a stroller 90 and to illuminate the surroundings of the stroller during conditions of low lighting and nighttime. The instant stroller lighting kit 10 includes a plurality of LED lighting units 20. Each lighting unit 20 includes a housing 25, a plurality of LED lights 30 disposed on the housing 25, and an attachment member 35 attached to a rear wall 27 of the housing 25. The LED lights 30 comply with applicable local, State, and Federal bicycle-illumination laws and child safety laws as feasible and cost-efficient.

A LED front lighting unit 40 is attached to a front side of the stroller 90 and has white LED lights, resembling vehicle headlights. The front lighting unit 40 is also tiltable for increased visibility. In addition, the front lighting unit 40 may be removably attached to the front side of the stroller 90 with a bracket mount.

Figure 2:
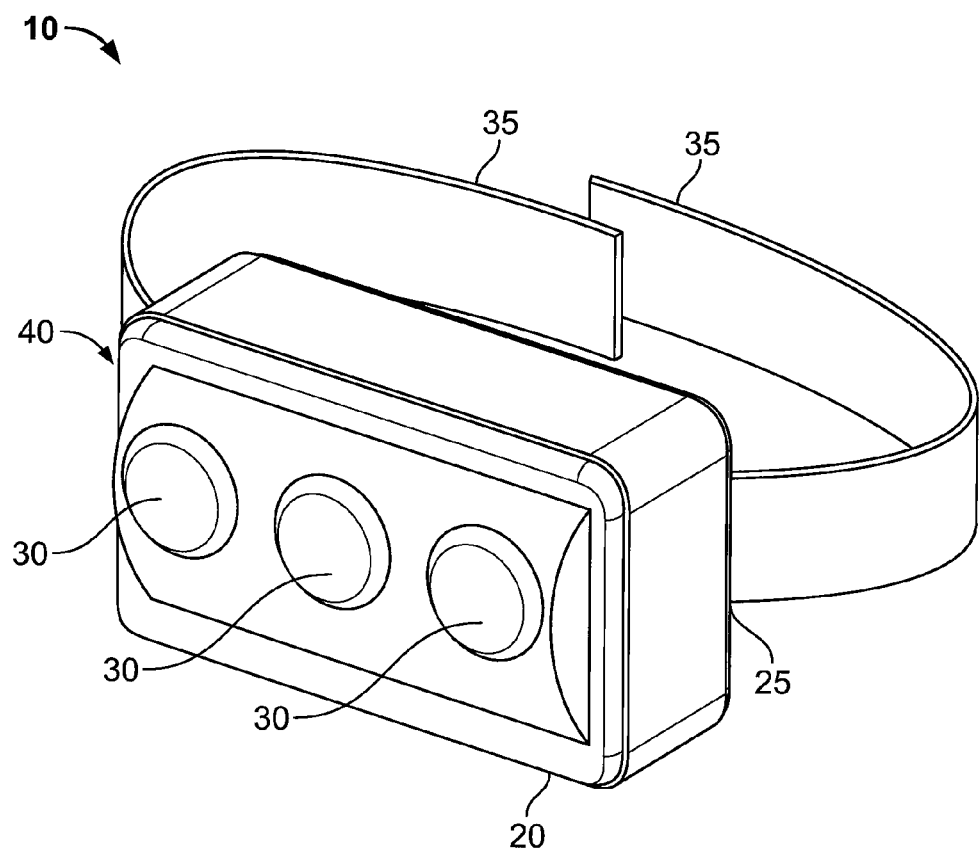
FIG. 2 is an isometric view of a rear lighting unit according to the present inventions.
Figure 3:
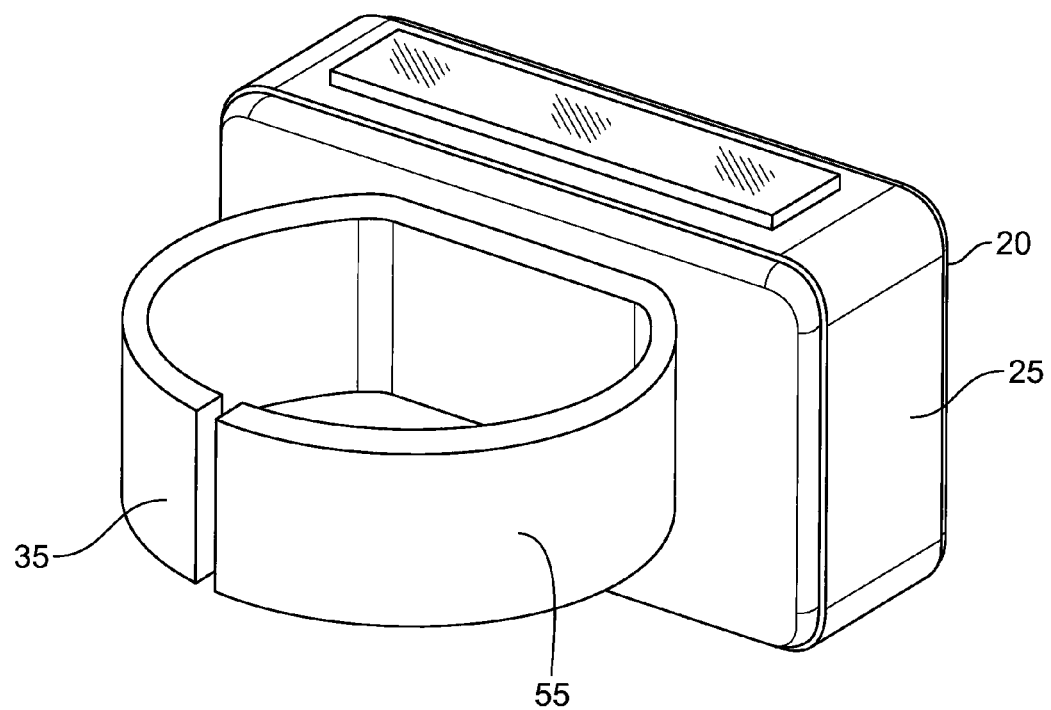
FIG. 3 is an isometric view of a front lighting unit, according to the present inventions.
Figure 4:
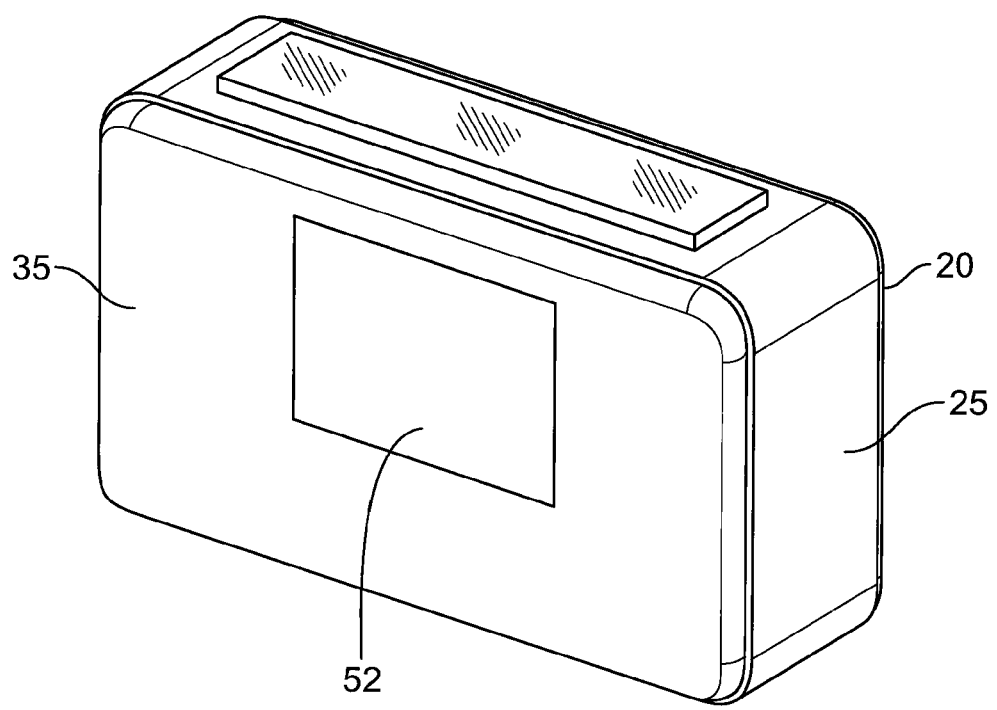
FIG. 4 is a rear isometric view of a lighting unit having a clip attachment member, according to the present inventions.

A LED side lighting unit 42 is attached to each of the left and right sides of the stroller and has red reflector lights. One of the left and right side lighting units 42 has a rear-facing white light for increased visibility. Referring now to FIGS. 2-4, further embodiments show a plurality of units 40 attachable to strollers. USB Charging, as known to those skilled in the art, enables lights to be plugged in so that charges are maintained over time.

The housing 25 is provided in a wide range of varying sizes and in a wide range of colors and in a transparent form. Each lighting unit 20, 40, 42 has at least one LED light 30 thereon, although at least three LED lights 30 are preferred. The attachment member 35 is an elastic strap 52, and alternately a rare-earth magnet 52, a zip tie, silicone or rubber strap, a clip 55, or bracket with nuts and bolts provided for permanent attachment to the stroller 90. Those skilled understand that each mechanical attachment is interchangeable with related means for temporary or permanent attachment.

According to embodiments, each lighting unit has a height of up to approximately ¾ inch, a width of 1½ inches, and a depth of ¾ inch. In addition, the LED lights last up to approximately 100,000 hours and require little maintenance.

Figure 5:
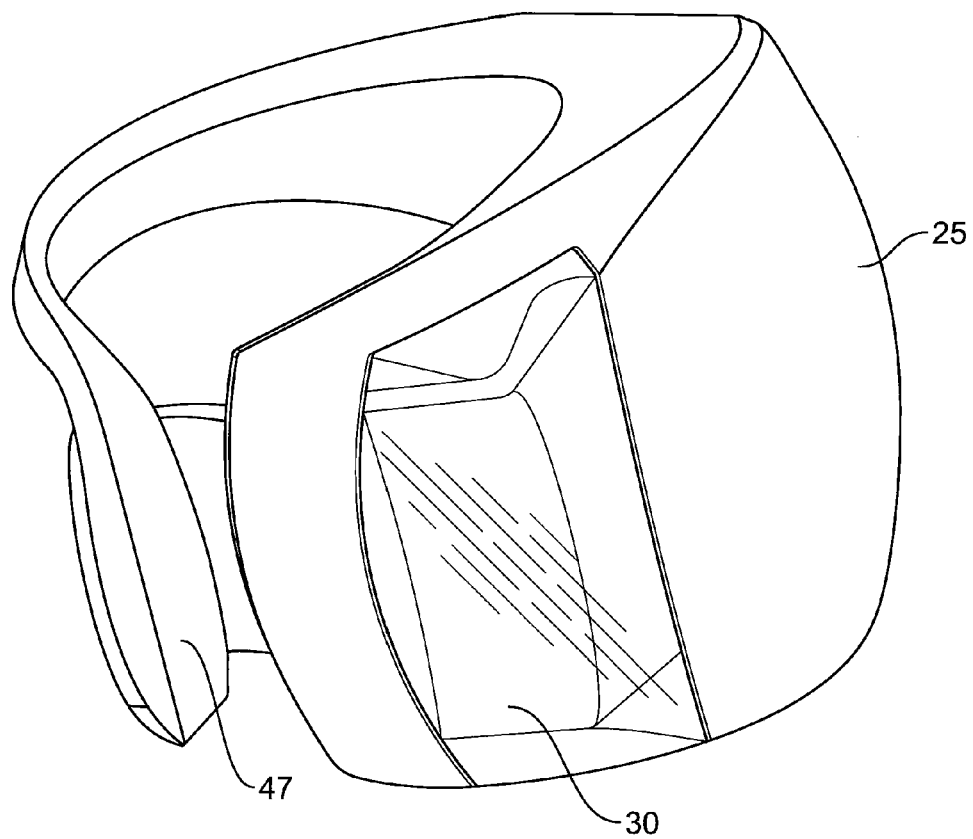
FIG. 5 is a plan view of an alternate lighting unit having a silicone housing, according to the present inventions.

Referring now to FIG. 5, silicone housing 25 houses at least one lighting unit 30 along with attachment arm 47. Those skilled in the art readily understand that attachment arm 47 may be plastically reformed such that it is bracingly engaged with any bar-like member in any conventional stroller.

Figure 6:
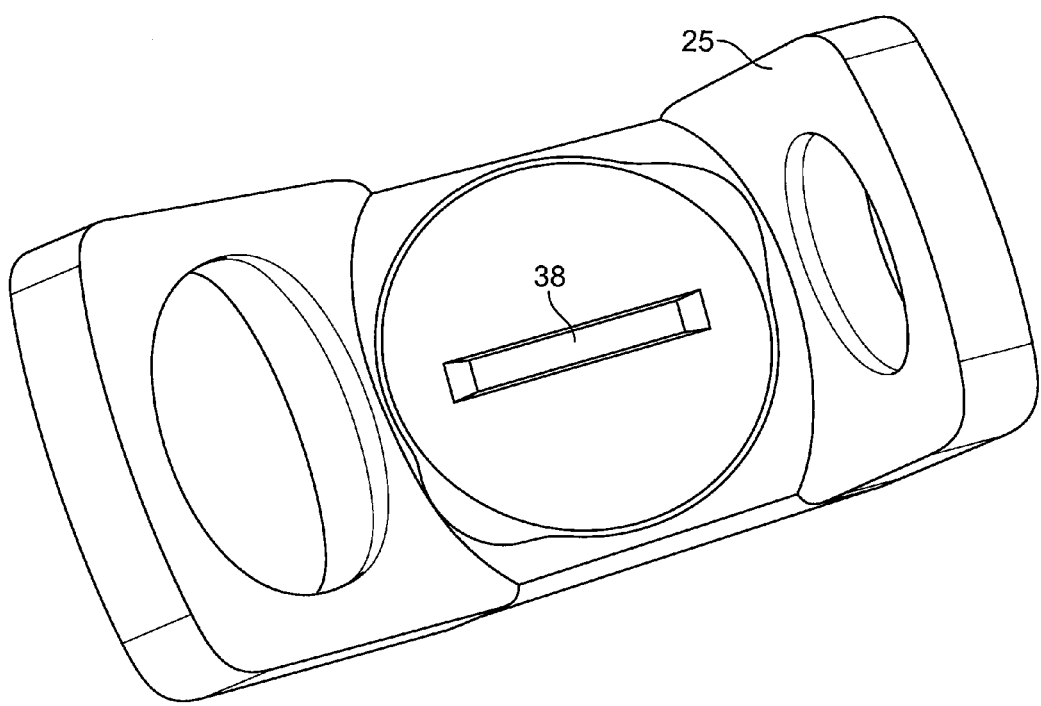
FIG. 6 is a back view showing a safety lock for batteries according to the present inventions.
Figure 7:
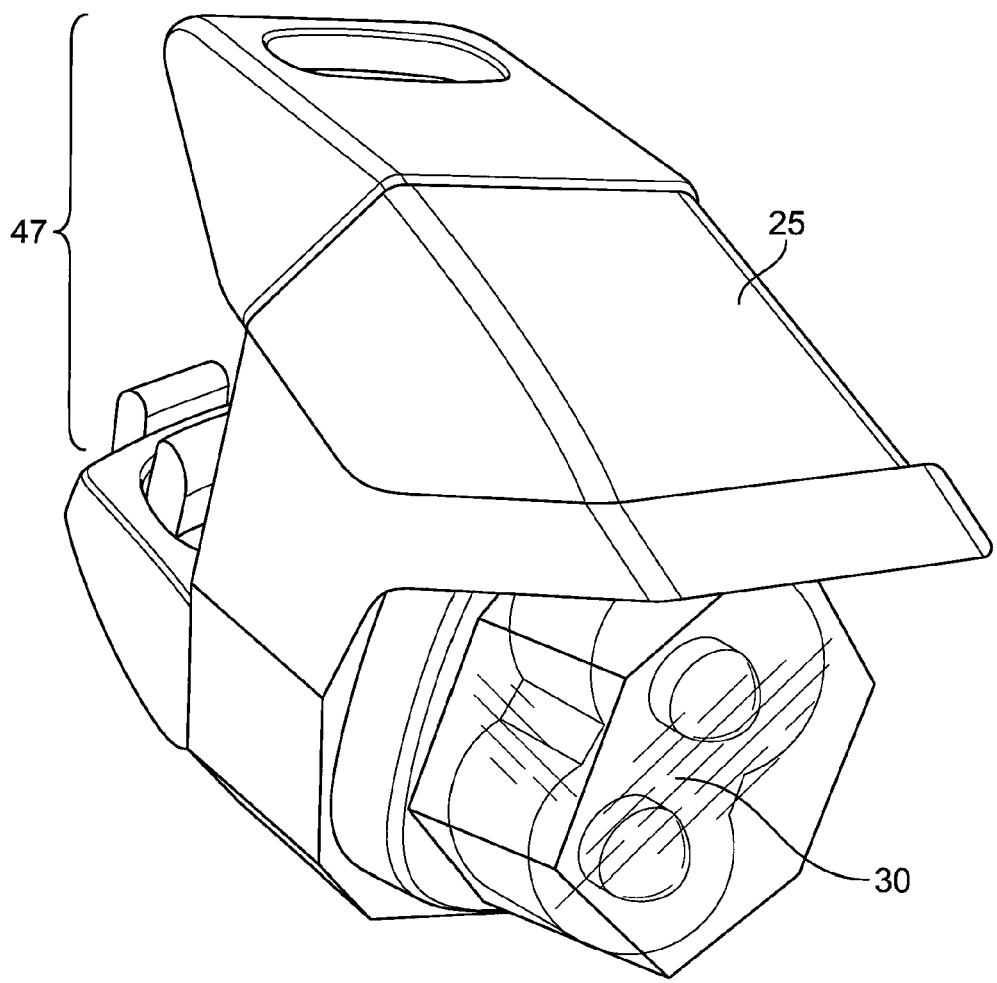
FIG. 7 shows an alternate embodiment of a lighting unit, according to the present inventions.

Referring now to FIG. 6, housing 25 may be equipped with apertures to accommodate stroller bars, and has safety lock 38 to prevent child access to batteries. FIG. 7 likewise shows housing 25 LED light 30 and attachment mechanism 47, in this instance a clip and detent mechanism.

Figure 8:
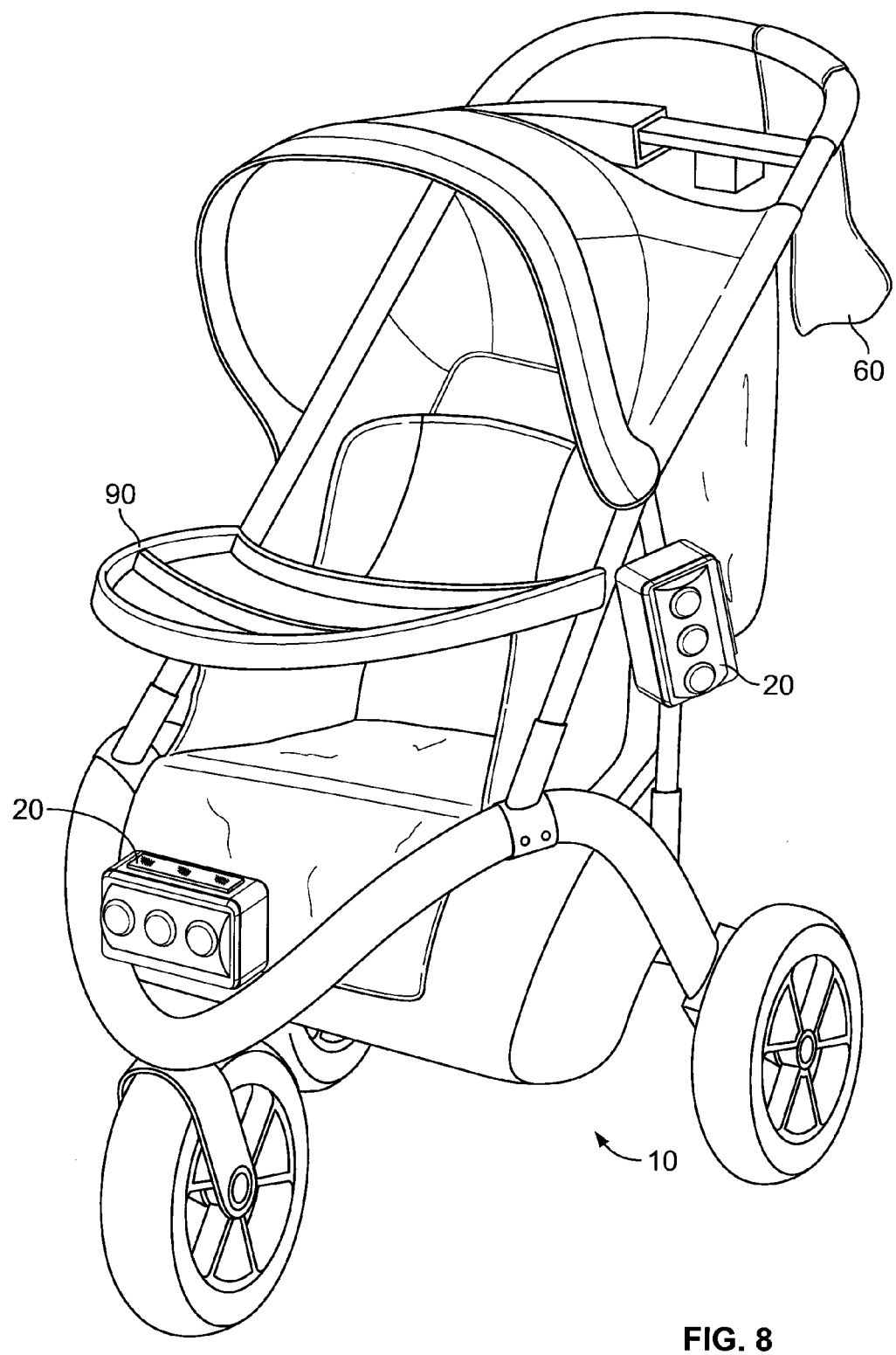
FIG. 8 shows a stroller equipped with lighting units, according to the present inventions.
Figure 9:
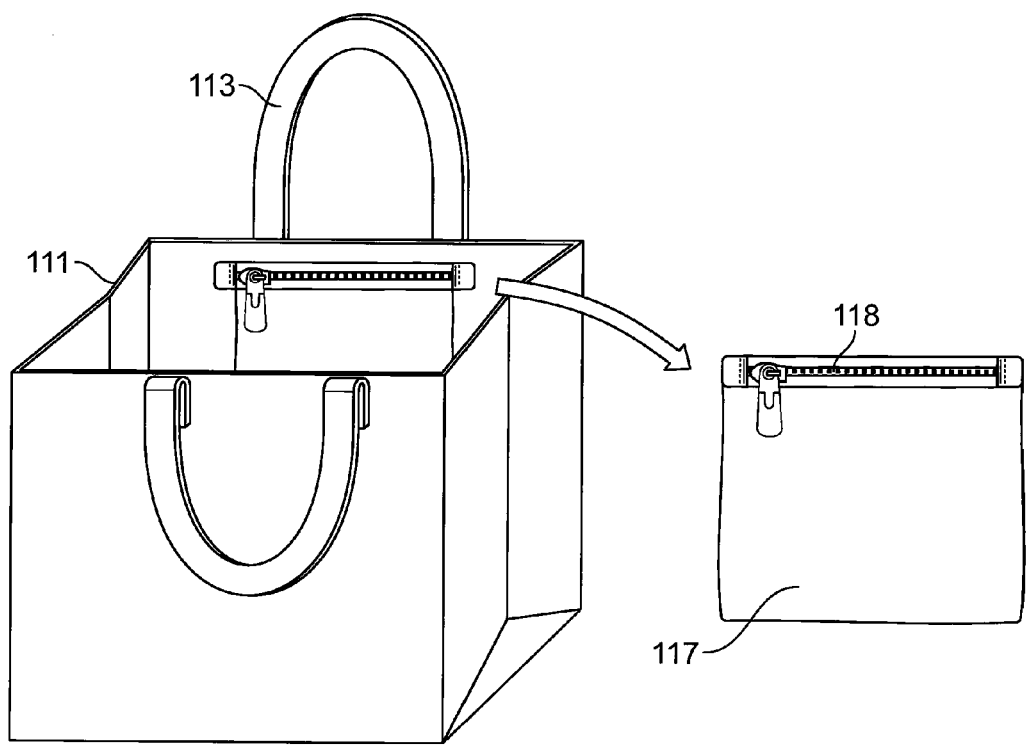
FIG. 9 shows an exemplary sac-like bag member.

FIG. 8 shows a conventional stroller 90, having lighting kit 190 attached thereto. Lighting units 20, attachable to front and side. Sac-like bag 60 is further detailed in FIG. 9, wherein straps 112 zipped or Velcro-bonded fasteners 118 allow for subcontainer 117 to hold items discrete from sac-like bag 60. Seam at 111, shows how sac-like bag 60 is foldable.

A storage bag 60, including a console, is provided for storage of the lighting units. Each storage bag 60 is provided with a carabineer for attachment to the stroller 90, although artisans may readily substitute functional equivalents for the same. Other storage bags may include, but are not limited to, a reusable grocery bag with a zipper pocket located inside for Buggy Lights™ storage. This bag can also double as a bag that folds into itself into the zipper pouch.

With respect to the above description then, it is to be realized that the optimum dimensional relationships for the parts of the present stroller lighting kit to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out," "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the method and apparatus have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged. Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A lighting system for strollers, comprising, in combination:
   at least a lighting unit disposed within a housing;
   an attachment member affixed to the rear wall of the housing or incorporating the at least a lighting unit;

a carrying enclosure for housing and transporting the at least a lighting unit, attachment member and related accoutrements, whereby the carrying enclosure is configured as a bag-like sac and readily attachable to any known stroller;

wherein said lighting unit is at least one lighting element selected from the group consisting essentially of: LED's, incandescents, halogens, solar-powered lights, low pressure sodium lights, reflective lights, LED silicone lights and other visible lights perceptible by humans;

further comprising:

at least a front lighting unit attachable to at least one of and front middle side of a stroller;

at least one side lighting unit attachable to each of the sides of the stroller; and, the carrying enclosure likewise includes additional attachments; instructions, promotional products or other accoutrements;

wherein said at least a front lighting unit is tiltable, being capable of being adjusted to enhance visibility, and each lighting unit has a height of at least about ¾ inch, and approximate width of 1½ inches and a depth of at least about ¾ inch;

further comprising a mechanical interface made up of a bracket mount, or removable and adjustable closure of attachment to ensure universal usage for all types of strollers (different circumference of closures);

further comprising, at least a pair of colored reflective lights and a rear-facing white light, attached to one of the colored reflective lights, and one forward-facing white headlight to illuminate the path and for visibility to others.

2. A lighting system for strollers, comprising, in combination:

at least a lighting unit disposed within a housing;

an attachment member affixed to the rear wall of the housing or incorporating the at least a lighting unit;

a carrying enclosure for housing and transporting the at least a lighting unit, attachment member and related accoutrements, whereby the carrying enclosure is configured as a bag-like sac and readily attachable to any known stroller;

wherein said lighting unit is at least one lighting element selected from the group consisting essentially of: LED's, incandescents, halogens, solar-powered lights, low pressure sodium lights, reflective lights, LED silicone lights and other visible lights perceptible by humans;

further comprising:

at least a front lighting unit attachable to at least one of and front middle side of a stroller;

at least one side lighting unit attachable to each of the sides of the stroller; and, the carrying enclosure likewise includes additional attachments; instructions, promotional products or other accoutrements;

wherein said at least a front lighting unit is tiltable, being capable of being adjusted to enhance visibility, and each lighting unit has a height of at least about ¾ inch, and approximate width of 1½ inches and a depth of at least about ¾ inch;

further comprising a mechanical interface made up of a bracket mount, or removable and adjustable closure of attachment to ensure universal usage for all types of strollers (different circumference of closures);

further comprising, at least a pair of colored reflective lights and a rear-facing white light, attached to one of the colored reflective lights, and one forward-facing white headlight to illuminate the path and for visibility to others;

wherein each said lighting unit has at least one of a screw and a locking mechanism to prevent child access to batteries, further comprising each said housing being custom colored and sized and transparent.

3. A lighting system for strollers, comprising, in combination:

at least a lighting unit disposed within a housing;

an attachment member affixed to the rear wall of the housing or incorporating the at least a lighting unit;

a carrying enclosure for housing and transporting the at least a lighting unit, attachment member and related accoutrements, whereby the carrying enclosure is configured as a bag-like sac and readily attachable to any known stroller;

wherein said lighting unit is at least one lighting element selected from the group consisting essentially of: LED's, incandescents, halogens, solar-powered lights, low pressure sodium lights, reflective lights, LED silicone lights and other visible lights perceptible by humans;

further comprising, at least a front lighting unit attachable to at least one of and front middle side of a stroller;

at least one side lighting unit attachable to each of the sides of the stroller; and, the carrying enclosure likewise includes additional attachments; instructions, promotional products or other accoutrements;

wherein said at least a front lighting unit is tiltable, being capable of being adjusted to enhance visibility, and each lighting unit has a height of at least about ¾ inch, and approximate width of 1½ inches and a depth of at least about ¾ inch;

further comprising a mechanical interface made up of a bracket mount, or removable and adjustable closure of attachment to ensure universal usage for all types of strollers (different circumference of closures);

further comprising, at least a pair of colored reflective lights and a rear-facing white light, attached to one of the colored reflective lights, and one forward-facing white headlight to illuminate the path and for visibility to others;

wherein each said lighting unit has at least one of a screw and a locking mechanism to prevent child access to batteries, further comprising each said housing being custom colored and sized and transparent;

wherein the attachment member further comprises at least one fixating device selected from the group of elastic straps, rare earth magnets, clips and brackets having nuts and bolts, silicone/rubber built into lights, and/or a custom ziptie.

4. A lighting system for strollers, comprising, in combination:

at least a lighting unit disposed within a housing;

an attachment member affixed to the rear wall of the housing or incorporating the at least a lighting unit;

a carrying enclosure for housing and transporting the at least a lighting unit, attachment member and related accoutrements, whereby the carrying enclosure is configured as a bag-like sac and readily attachable to any known stroller;

wherein said lighting unit is at least one lighting element selected from the group consisting essentially of: LED's, incandescents, halogens, solar-powered lights, low pressure sodium lights, reflective lights, LED silicone lights and other visible lights perceptible by humans;

further comprising:

at least a front lighting unit attachable to at least one of and front middle side of a stroller;

at least one side lighting unit attachable to each of the sides of the stroller; and, the carrying enclosure likewise includes additional attachments; instructions, promotional products or other accoutrements;

wherein said at least a front lighting unit is tiltable, being capable of being adjusted to enhance visibility, and each lighting unit has a height of at least about ¾ inch, and approximate width of 1½ inches and a depth of at least about ¾ inch;

further comprising a mechanical interface made up of a bracket mount, or removable and adjustable closure of attachment to ensure universal usage for all types of strollers (different circumference of closures);

further comprising, at least a pair of colored reflective lights and a rear-facing white light, attached to one of the colored reflective lights, and one forward-facing white headlight to illuminate the path and for visibility to others;

wherein each said lighting unit has at least one of a screw and a locking mechanism to prevent child access to batteries, further comprising each said housing being custom colored and sized and transparent;

wherein the attachment member further comprises at least one fixating device selected from the group of elastic straps, rare earth magnets, clips and brackets having nuts and bolts, silicone/rubber built into lights, and/or a custom ziptie;

each said fixating device providing temporary attachment to a stroller and adjustability of circumference of stroller bars and/or handles.

5. The stroller lighting system of claim 4,

A lighting system for strollers, comprising, in combination:

at least a lighting unit disposed within a housing;

an attachment member affixed to the rear wall of the housing or incorporating the at least a lighting unit;

a carrying enclosure for housing and transporting the at least a lighting unit, attachment member and related accoutrements, whereby the carrying enclosure is configured as a bag-like sac and readily attachable to any known stroller;

wherein said lighting unit is at least one lighting element selected from the group consisting essentially of: LED's, incandescents, halogens, solar-powered lights, low pressure sodium lights, reflective lights, LED silicone lights and other visible lights perceptible by humans;

further comprising:

at least a front lighting unit attachable to at least one of and front middle side of a stroller;

at least one side lighting unit attachable to each of the sides of the stroller; and, the carrying enclosure likewise includes additional attachments; instructions, promotional products or other accoutrements;

wherein said at least a front lighting unit is tiltable, being capable of being adjusted to enhance visibility, and each lighting unit has a height of at least about ¾ inch, and approximate width of 1½ inches and a depth of at least about ¾ inch;

further comprising a mechanical interface made up of a bracket mount, or removable and adjustable closure of attachment to ensure universal usage for all types of strollers (different circumference of closures);

further comprising, at least a pair of colored reflective lights and a rear-facing white light, attached to one of the colored reflective lights, and one forward-facing white headlight to illuminate the path and for visibility to others;

wherein each said lighting unit has at least one of a screw and a locking mechanism to revent child access to batteries further comprising each said housing being custom colored and sized and transparent;

wherein the attachment member further comprises at least one fixating device selected from the group of elastic straps, rare earth magnets, clips and brackets having nuts and bolts, silicone/rubber built into lights, and/or a custom ziptie;

each said fixating device providing temporary attachment to a stroller and adjustability of circumference of stroller bars and/or handles; and, each said fixating device providing permanent attachment to a stroller.

* * * * *